United States Patent
Edara et al.

(10) Patent No.: US 9,813,965 B1
(45) Date of Patent: Nov. 7, 2017

(54) MEASURING CONNECTION SIGNAL STRENGTH

(71) Applicant: Amazon Technologies, Inc., Reno, NV (US)

(72) Inventors: Kiran Kumar Edara, Cupertino, CA (US); Varadarajan Gopalakrishnan, Cupertino, CA (US)

(73) Assignee: Amazon Technologies, Inc., Reno, NV (US)

( * ) Notice: Subject to any disclaimer, the term of this patent is extended or adjusted under 35 U.S.C. 154(b) by 223 days.

(21) Appl. No.: 13/718,094

(22) Filed: Dec. 18, 2012

(51) Int. Cl.
*H04W 36/00* (2009.01)
*H04W 36/30* (2009.01)
*H04W 84/12* (2009.01)
*H04W 4/12* (2009.01)
*H04W 48/12* (2009.01)
*H04W 24/02* (2009.01)
*H04W 64/00* (2009.01)
*H04W 88/08* (2009.01)
*H04W 48/10* (2009.01)
*H04W 4/14* (2009.01)
*H04W 8/20* (2009.01)
*H04W 8/02* (2009.01)
(Continued)

(52) U.S. Cl.
CPC ............. *H04W 36/30* (2013.01); *H04W 4/008* (2013.01); *H04W 4/02* (2013.01); *H04W 4/021* (2013.01); *H04W 4/12* (2013.01); *H04W 4/14* (2013.01); *H04W 4/22* (2013.01); *H04W 8/005* (2013.01); *H04W 8/02* (2013.01); *H04W 8/08* (2013.01); *H04W 8/20* (2013.01); *H04W 24/00* (2013.01); *H04W 24/02* (2013.01); *H04W 28/08* (2013.01); *H04W 36/0061* (2013.01); *H04W 36/0083* (2013.01); *H04W 36/08* (2013.01); *H04W 36/32* (2013.01); *H04W 48/08* (2013.01); *H04W 48/10* (2013.01); *H04W 48/12* (2013.01); *H04W 64/00* (2013.01); *H04W 64/006* (2013.01); *H04W 84/12* (2013.01); *H04W 84/18* (2013.01); *H04W 88/06* (2013.01); *H04W 88/08* (2013.01)

(58) Field of Classification Search
CPC ............. H04W 36/00; H04W 36/0061; H04W 36/0083; H04W 36/0088; H04W 36/35; H04W 40/36
USPC .................................................. 455/434–442
See application file for complete search history.

(56) References Cited

U.S. PATENT DOCUMENTS 6,351,642 B1 * 2/2002 Corbett ................. H04W 36/32
455/440
7,082,305 B2 * 7/2006 Willars ............. H04B 7/18541
342/357.4

(Continued)

*Primary Examiner* — Charles Appiah
*Assistant Examiner* — Jaime Holliday
(74) *Attorney, Agent, or Firm* — Polsinelli LLP

(57) ABSTRACT

Approaches are described which enable a user equipment (UE) device (e.g., mobile phone, tablet computer) to measure signal strength of neighboring cells in a cellular network based at least in part on direction and/or location information of the UE device. The computing device may determine, based on location and/or direction information, that the device is moving away from a neighboring cell and either stop measuring the signal strength or reduce the rate of measuring the signal strength of that neighboring cell. This selective measuring can enable computing devices to conserve battery power and reduce processing overhead when moving between cells of a cellular network.

18 Claims, 6 Drawing Sheets

(51) Int. Cl.
*H04W 4/02* (2009.01)
*H04W 4/22* (2009.01)
*H04W 24/00* (2009.01)
*H04W 8/08* (2009.01)
*H04W 8/00* (2009.01)
*H04W 88/06* (2009.01)
*H04W 36/32* (2009.01)
*H04W 28/08* (2009.01)
*H04W 4/00* (2009.01)
*H04W 84/18* (2009.01)
*H04W 36/08* (2009.01)
*H04W 48/08* (2009.01)

(56) References Cited

U.S. PATENT DOCUMENTS

| | | | |
|---|---|---|---|
| 7,668,548 B2* | 2/2010 | Choi | 455/437 |
| 7,826,847 B1* | 11/2010 | Roskowski et al. | 455/436 |
| 2006/0205406 A1* | 9/2006 | Pekonen et al. | 455/436 |
| 2012/0214484 A1* | 8/2012 | Shetty et al. | 455/434 |
| 2013/0012212 A1* | 1/2013 | Murakami et al. | 455/439 |
| 2014/0064247 A1* | 3/2014 | Teyeb | H04W 36/0083 370/331 |

* cited by examiner

MEASURING CONNECTION SIGNAL STRENGTH

BACKGROUND

People are increasingly relying on computing devices, such as mobile phones, tablet computers, electronic reader devices (e.g., e-ink readers), etc. for every day communications. Such computing devices are sometimes referred to as User Equipment (UE) and they are usually capable of wirelessly connecting to a cellular network, such as a Long Term Evolution (LTE) network, a Wideband Code Division Multiple Access (W-CDMA) network, a Global System for Mobile Communications (GSM) network, a Code Division Multiple Access (CDMA) network, or the like.

Conventionally, UE devices establish a connection with the cellular network by selecting a cell with the strongest signal for the current location and conditions. The signal strength detected by a UE device can vary as the device is moved to different areas, when the conditions through which the signal is transmitted change, or for various other reasons. Accordingly, conventional UE devices will periodically measure the signal strength of neighboring cells in the cellular network in order to determine when to switch to another cell, where the strength of the signal for the neighboring cell is stronger than the signal for the currently connected cell.

BRIEF DESCRIPTION OF THE DRAWINGS

Various embodiments in accordance with the present disclosure will be described with reference to the drawings, in which.

DETAILED DESCRIPTION

Figure 1:
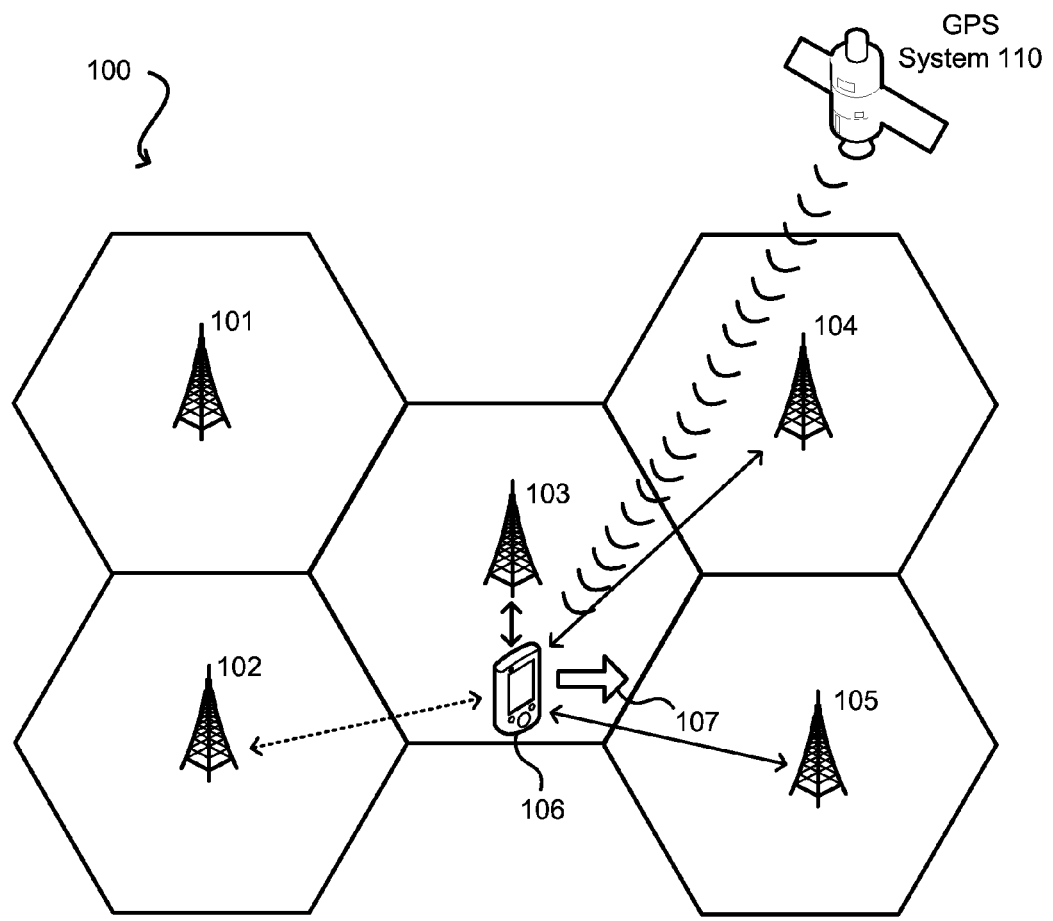
FIG. 1 illustrates an example of a mobile computing device that uses location and/or direction information to selectively measure the signal strength of neighboring cells in a cellular network, in accordance with various embodiments.
Figure 1:
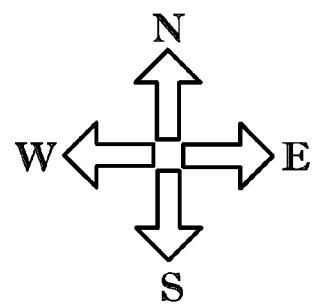

In the following description, various embodiments will be illustrated by way of example and not by way of limitation in the figures of the accompanying drawings. References to various embodiments in this disclosure are not necessarily to the same embodiment, and such references mean at least one. While specific implementations and other details are discussed, it is to be understood that this is done for illustrative purposes only. A person skilled in the relevant art will recognize that other components and configurations may be used without departing from the scope and spirit of the claimed subject matter.

Systems and methods in accordance with various embodiments of the present disclosure may overcome one or more of the aforementioned and other deficiencies experienced in conventional approaches for enabling and/or managing wireless communications on one or more electronic devices. In particular, various approaches discussed herein enable a portable computing device (e.g., mobile phone, tablet computer) to use location and/or direction information to selectively measure the signal strength of neighboring cells in a cellular network. For example, a computing device (e.g., UE device) may determine, based on location and/or direction information, that the device is moving away from a neighboring cell and either stop measuring the signal strength of that cell or reduce the rate of measuring the signal strength of that cell. This selective measuring can enable computing devices to conserve battery power and reduce processing overhead when moving between cells of a cellular network.

In conventional cellular networks, computing devices (e.g., UE devices) are often autonomously scanning the signal strength of the cell that they are currently camped on, as well as nearby neighboring cells (e.g., based on a rate specified by 3GPP standard). For example, a computing device that is in an idle state (e.g., having no active radio connection session with the network) may perform cell reselection process in which the device scans the signal strength of neighboring cells. The list of the neighboring cells is provided by the network as a broadcast message that is received by the computing device. When the device detects that the signal of its current cell has fallen below a certain threshold and/or when a neighboring cell's signal becomes stronger than a certain threshold, the device can autonomously switch to the neighboring cell. Conventionally, each of the neighboring cells is associated with its own set of network configuration parameters, such as cell frequency, scrambling code, channel, or the like. When the device switches from one cell to another, it goes through a reselection process, where a new channel is automatically selected for the device on a new base station which will serve the device. The device then automatically switches from the current channel to the new channel, potentially without any interruption in service.

One drawback of this process is that computing devices (e.g., UE devices) are often scanning neighboring cells unnecessarily, such as in the case where the device is moving away from the neighboring cell. For example, when a computing device is moving and heading east, the device may receive a broadcast message with a neighbor list that includes a neighboring cell located to the west. Although the cell is included in the list of neighbors, in many instances, it may be desirable for the device to stop or at least reduce the rate of scanning the neighboring cell to the west in order to conserve resources.

In accordance with various embodiments, the computing device can utilize location and/or direction information to selectively scan the signal strength of specific neighboring cells of a cellular network. The scanning can be controlled based on both the cell location information and the geographic location of the device. In one embodiment, the computing device receives cell location information for each of the neighboring cells as part of a network broadcast message that identifies the neighboring cells. In another embodiment, the device may receive the cell location information from another source, such as from a remote server or database that maintains network cell location information. The cell location information can include but is not limited to the coordinates of a center of the cell, a radius of the cell, or information identifying the edges of the cell.

In accordance with an embodiment, the computing device determines its own geographic location based at least in part on data obtained by a position determining element, such a Global Positioning System (GPS) receiver embedded in the device. In addition (or alternatively), the computing device may identify the direction of movement of the device, such as by comparing several locations measured at different times. In some embodiments, the direction of movement may also be identified based at least in part on data provided by an accelerometer, gyroscope or other sensor of the computing device.

In accordance with an embodiment, the computing device can selectively control the measuring of the signal strength of one or more neighboring cells based at least in part the cell location information and the location of the device. For example, the computing device may compare the cell location information of a neighboring cell to its own location to determine proximity and then determine that the neighboring cell is located at a distance greater than a certain threshold. The device may then either reduce the rate of scanning the signal strength of that cell or discontinue measuring the signal strength of the cell altogether. As another example, the computing device may determine that the computing device is currently moving and heading in a particular direction and reduce/discontinue scanning the cells located in the opposite direction.

In various embodiments, when the computing device detects that the signal strength of a neighboring cell exceeds a predefined threshold, and/or when the signal strength of its current cell drops below a certain threshold, the device may switch to the new cell and begin communicating using the configuration parameters (frequency, scrambling code, etc.) of that cell.

In some embodiments, upon switching to the new cell, the computing device can transmit cell location information and other data to a remote system that maintains a central database of network cell location data for the entire network. The data transmitted to the remote system can include but is not limited to geographical data (e.g., GPS coordinates) about the cell, signal strength at a particular location, type of tower information, distance where the device can get acceptable signal strength, and other information that may be useful in identifying cell borders. The remote system may receive the information from the device and may also provide to the device information about the neighboring cells of the new cell on which the device is currently on. In this manner, the remote system can collect cell location information and other data from a plurality of computing devices moving through the network and can use this information to assist the devices with suggestions for scanning their respective neighboring cells.

FIG. 1 illustrates an example 100 of a mobile computing device that uses location and/or direction information to selectively measure the signal strength of neighboring cells in a cellular network, in accordance with various embodiments. In the illustrated embodiment, a computing device 106 is moving in a particular direction (e.g., heading east) within a cellular network that includes a number of cells (101, 102, 103, 104, 105). As used throughout this disclosure, a cellular network can include any wireless communications network that is subdivided into a plurality of cells, where each cell is served by at least one base station. Some examples of cellular networks include It should be noted that this figure uses a logical illustration of each cell as having a hexagonal shape, however, this shape is used purely for purposes of illustration, and in reality, the cells may end up having different shapes, such as approximately oval, often overlapping and in many cases non-uniform shapes. Each cell is supported by at least one base station. A base station can include any structure that includes one or more antennas, transceivers and/or other wireless communication equipment to allow a computing device to establish a connection to the network. In various embodiments, a single base station can serve one cell or a plurality of cells (e.g., 6 cells, 8 cells, etc.). Similarly, one cell may be served by more than one base station.

In various embodiments, the computing device 106 may be camped on a particular cell, where the computing device 106 is configured to use the network configuration parameters of that cell. The configuration parameters may include the frequency, scrambling code, channel and/or other information used to communicate on the cell. For example, in one embodiment, each neighboring cell may use a different frequency and the device may need to switch communication to that frequency in order to establish a connection on the cell. The wireless communications component of the device can include any mechanism capable of establishing wireless communication with one or more network elements of the cellular network. For example, the wireless communication component can include one or more antennas, transmitters, receivers, transceivers, and/or the like.

In the illustrated embodiment, the computing device 106 may be connected to a base station 103 of a particular cell at certain times and at other times, the device may be idle (e.g., having no active radio connection session with the network). When the device 106 is camped on a particular cell, the device 106 may receive a network broadcast message containing information identifying a plurality of neighboring cells of that cell. For example, the broadcast message received by the computing device 106 may include a list of neighboring cells having respective base stations (101, 102, 104, 105). These neighboring cells may be nearby cells of the same network technology (e.g., LTE) but using a different frequency than the current serving cell of the device, or the neighboring cells may be nearby cells of a different networking technology (e.g., CDMA, W-CDMA, GSM, etc.) than the currently serving cell. It should be noted that although this figure illustrates each cell having its own base station for purposes of simplicity, in many alternative embodiments, one base station may serve multiple cells (e.g., 6 cells, 8 cells, etc.).

In addition to the neighbor list, the computing device 106 can receive cell location information for each of the neighboring cells in the list. The cell location data can include, for example, the GPS coordinates of the center of the cell, the diameter (or approximate diameter) of the cell, the edges or borders of the cell, and the like. In some embodiments, the cell location information can be received as part of the network broadcast message that identifies the list of neighboring cells. In other embodiments, the computing device 106 can receive the cell location information from a remote system that maintains a database of cell location data for the cellular network. The remote system may gather the cell data from a plurality of computing devices moving throughout the network and aggregate the data to be used for assisting the devices in selectively measuring their respective neighboring cells.

In the illustrated embodiment, the computing device 106 determines its own location based at least in part on data obtained by a position determining device. In the illustrated embodiment, the location of the computing device is determined using a GPS receiver in communication with the GPS system 110. In other embodiments, however, the location can be determined using other position determining elements, such as gyroscope, accelerometer or others.

In one embodiment, the computing device 106 can also determine the direction 107 of movement of the computing device. The movement direction 107 can be computed by comparing locations measured at several points in time. Once the location and/or direction is determined, the computing device 106 may selectively scan the signal strength of the neighboring cells by using the location data. In particular, the computing device may analyze its own location/direction and the cell location data in order to select which neighboring cells should be scanned more or less frequently and which neighboring cells should not be scanned. For example, as illustrated in the figure, the computing device 106 may determine that the direction of movement is heading east and therefore the device 106 may choose to reduce or discontinue measuring the signal strength of cells located to the west, such as cells 101 and 102. In this example, the computing device 106 may stop measuring the signal strength of cell 101 and adjust the rate of measuring (e.g., scan less frequently) the signal strength of cell 102. In other examples, the computing device 106 may choose to more frequently scan the signal strength of neighboring cells located in the direction that the device is traveling (e.g., cells 104, 105). In other embodiments, the device 106 may adjust the measuring of signal strength based on location information alone, such as by scanning less frequently those cells located farther than a certain threshold from the device, or discontinuing the scanning of the cells located farther than another threshold.

When the computing device 106 detects that a neighboring cell has a signal strength higher than a predefined threshold with respect to the signal strength of its current cell (e.g., neighboring cell's signal is substantially higher than the current cell's signal), the device 106 can switch to the neighboring cell (e.g., modify its internal configuration parameters to the parameters of the neighboring cell).

In various embodiments, the process of scanning/measuring the signal strength of the neighboring cells, the list of neighboring cells, the network broadcast message and certain other functionality described herein can be specified in one or more standards, such as 3rd Generation Partnership Project (3GPP) standards (e.g., 3GPP LTE standard, 3GPP W-CDMA standard, etc.). In some cases, a particular standard may be modified to include information used to enable the various embodiments described herein. For example, in the 3GPP W-CDMA standard, the sections that may be modified may include measurement control information to be used in the cell, intra-frequency measurement system information, inter-frequency measurement information, and/or inter-RAT measurement system information. Similarly, in the 3GPP LTE standard, the sections that may be modified may include LTE intra-frequency neighbor information, LTE inter-frequency neighbor information, UTRA neighbor cell information, GSM neighbor cell information, CDMA200 neighbor cell information, and/or the like. It should be noted that, while possible, the modification of standards is not required to enable the functionality described herein.

Figure 2:
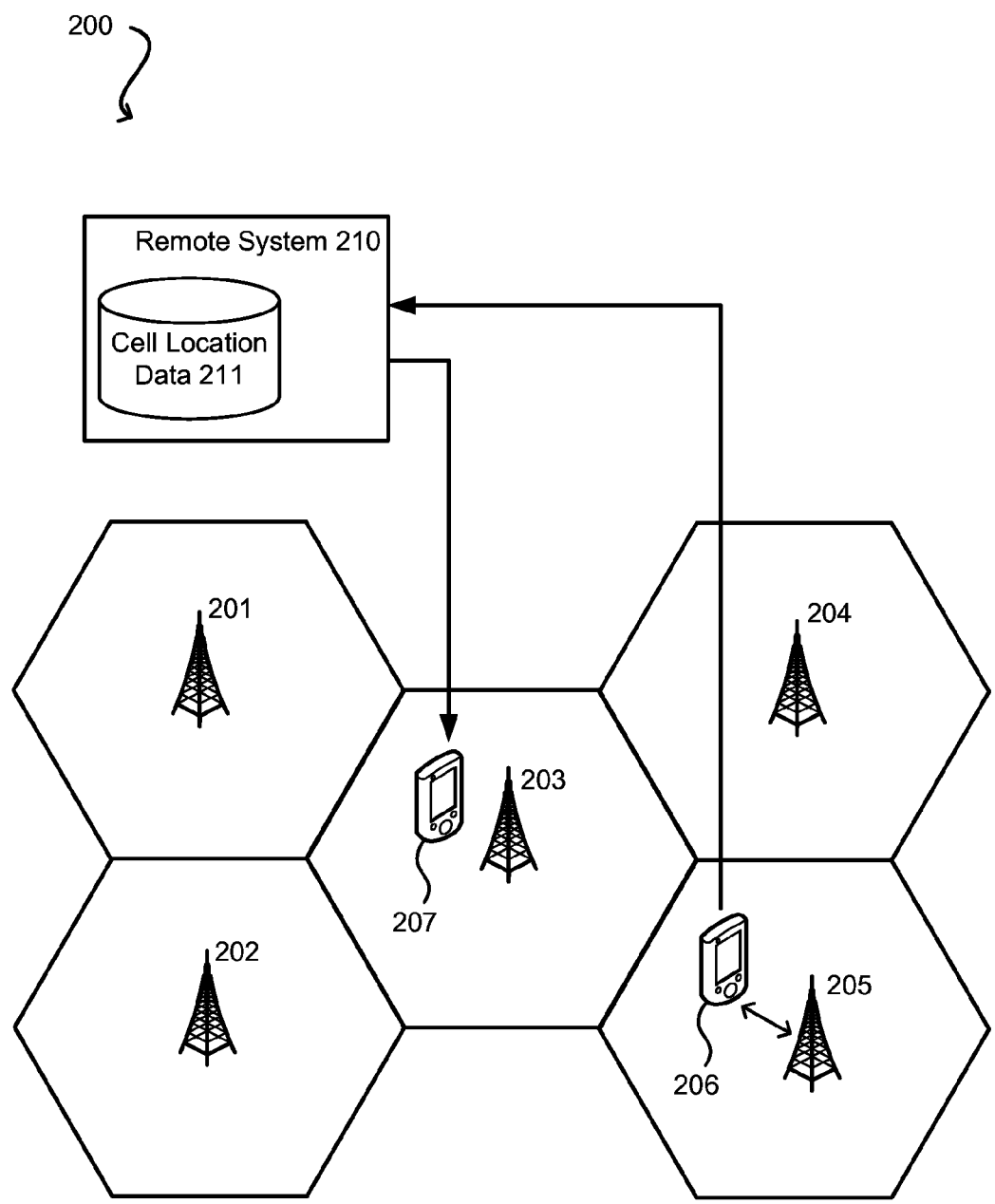
FIG. 2 illustrates an example of a computing device that is configured to transmit cell location information to a remote system that maintains a database of cell location information for the network, in accordance with various embodiments.

FIG. 2 illustrates an example 200 of a computing device that is configured to transmit cell location information to a remote system that maintains a database of cell location information for the network, in accordance with various embodiments. In the illustrated embodiment, when the computing device 206 switches to use the parameters of cell 205, the computing device can transmit cell location information and other data to a remote system 210. The remote system 210 can be any server or other device that is capable of maintaining a database of cell location data 211 for the cells (201, 202, 203, 204, 205) of the network. In one embodiment, the remote system 210 collects cell location data (e.g., center coordinates, radii, edge information, etc.) from a plurality of computing devices, such as devices 206, and 207. The remote system can then provide the information to the devices in order to assist the devices in selectively measuring the signal strength of neighboring cells based on their respective locations.

In the illustrated embodiment, when device 206 switches to cell 205, the device 206 can transmit the cell location data and other information to the remote system 210. For example, the device may transmit its own geographical location (e.g., GPS coordinates) along with any signal strength measurements, type of tower information, distance where the device was able obtain an acceptable signal strength, and any other data that may help with the identification of cell borders. The remote system 210 may then record the received information for future use by other devices. In addition, the remote system may respond by transmitting to the computing device 206, the cell location data for the neighboring cells of cell 205, such as cells 203 and 204.

In various embodiments, when another device, such as device 207 connects to a neighboring cell 205, the remote system 210 may provide to device 207, the cell location information for all cells that are neighboring cell 203, including the cell location data of cell 205 previously received from device 206. Similarly, device 207 may provide to the remote system, any cell location data related to cell 203. In this manner, the remote system 210 can aggregate location data collected by a plurality of computing devices moving throughout the cellular network and use this information to assist the computing devices with selective signal strength measurement of neighboring cells.

It should be noted that although FIG. 2 illustrates a remote system, such as a server, not all embodiments described herein are limited to collecting the cell location data in this manner. In alternative embodiments, the cell location data can be provided to computing devices by the network elements, such as during the broadcasting of messages that include cell neighbor lists, as previously described.

Figure 3:
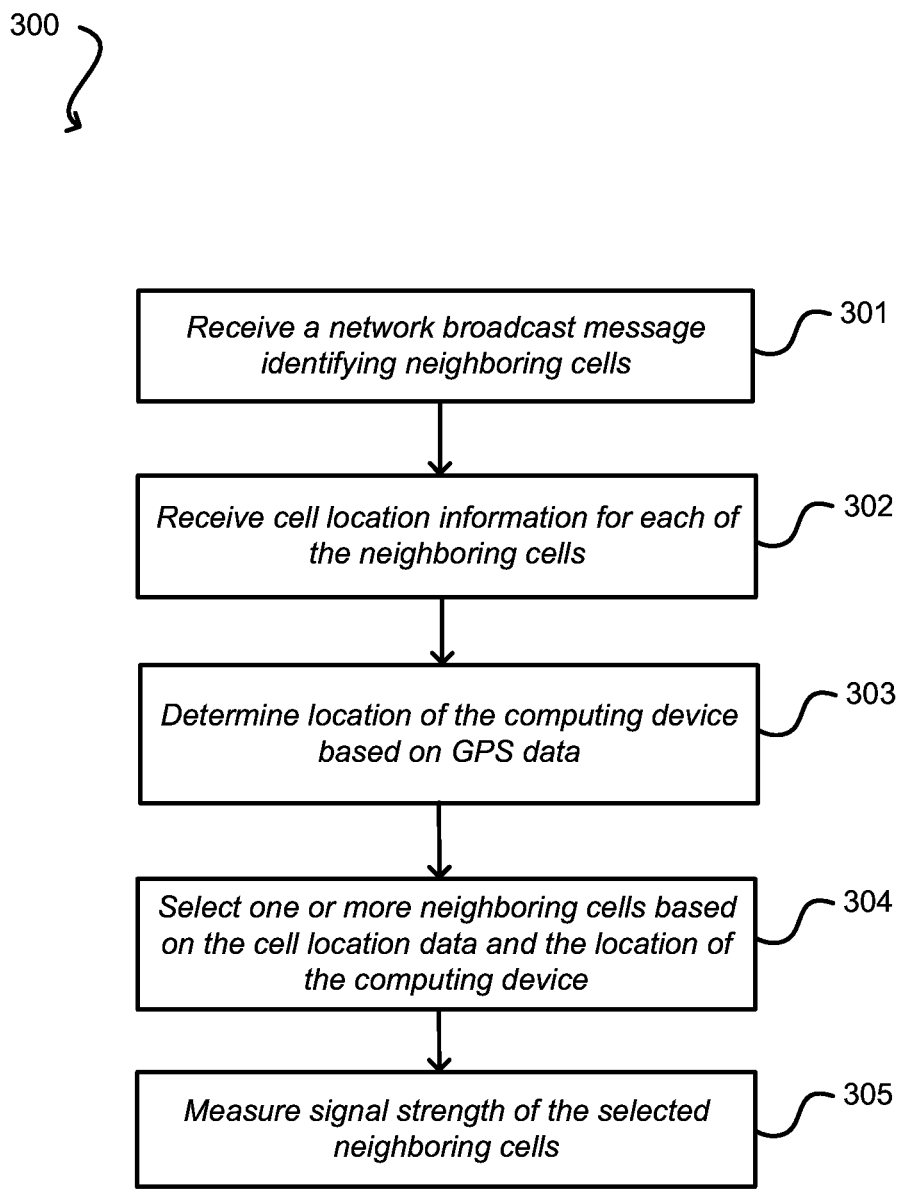
FIG. 3 illustrates an example of a process for selectively measuring neighbor cells by a computing device, in accordance with various embodiments.

FIG. 3 illustrates an example of a process 300 for selectively measuring neighbor cells by a computing device, in accordance with various embodiments. Although this figure may depict functional operations in a particular sequence, the processes are not necessarily limited to the particular order or operations illustrated. One skilled in the art will appreciate that the various operations portrayed in this or other figures can be changed, rearranged, performed in parallel or adapted in various ways. Furthermore, it is to be understood that certain operations or sequences of operations can be added to or omitted from the process, without departing from the scope of the various embodiments. In addition, the process illustrations contained herein are intended to demonstrate an idea of the process flow to one of ordinary skill in the art, rather than specifying the actual sequences of code execution, which may be implemented as different flows or sequences, optimized for performance, or otherwise modified in various ways.

In operation 301, the computing device receives a network broadcast message containing information identifying a plurality of neighboring cells in the cellular network. For example, the broadcast message may be part of a paging process where the network provides a neighbor list to the computing device. The neighboring cells may be nearby cells of the same network technology which use a different frequency than the current cell, or the neighboring cells may be nearby cells of a different networking technology than the currently serving cell. In operation 302, the computing device receives cell location information for each of the plurality of neighboring cells. In one embodiment, the cell location information is received as part of the network broadcast message. In other embodiments, the cell location data is obtained by other communications, or stored on the mobile device itself.

In operation 303, the computing device determines its own geographic location based at least in part on data obtained by a position determining device. For example, the computing device may obtain the GPS coordinates obtained by a GPS receiver embedded in the device. In some embodiments, the device may utilize the geographic location to determine a movement direction of the device.

In operation 304, the computing device selects one or more neighboring cells based at least in part on the cell location information and the location/direction of the computing device. In operation 305, the computing device measures the signal strength of the selected one or more neighboring cells. For example, the computing device may determine that its movement direction is heading east and, based on this information, select to measure the signal strength of the neighboring cells located to the east, but discontinue scanning the cells located to the west. Similarly, the computing device may choose to discontinue scanning neighboring cells whose center locations are located at a distance greater than a certain threshold.

Figure 4:
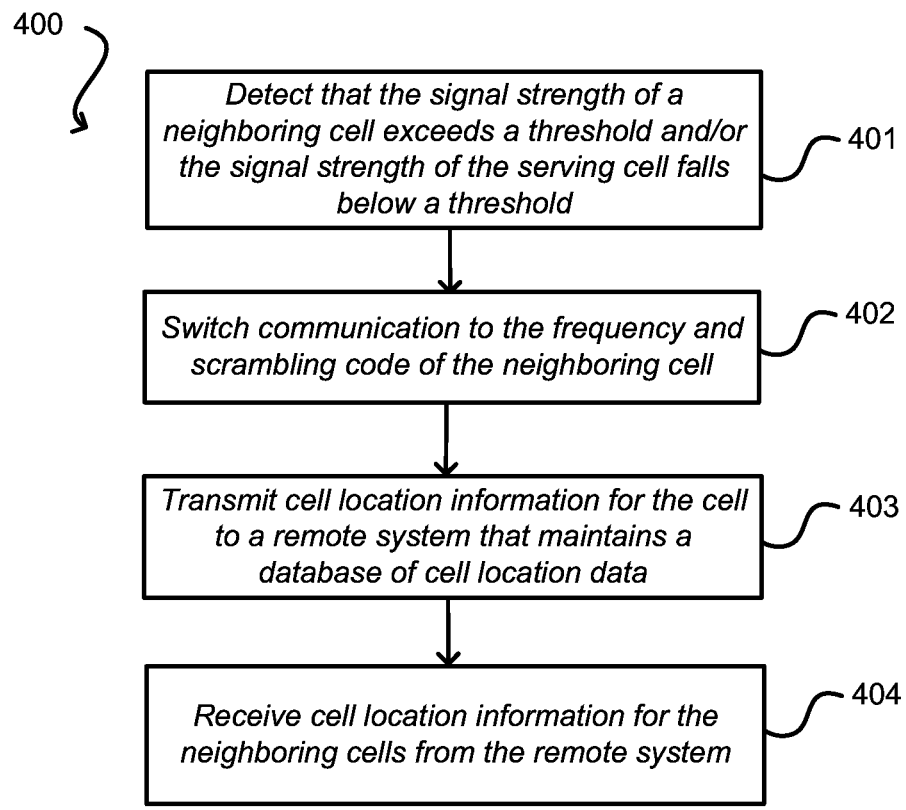
FIG. 4 illustrates an example of a process for providing cell location information to a remote system, in accordance with various embodiments.

FIG. 4 illustrates an example of a process for providing cell location information to a remote system, in accordance with various embodiments. In operation 401, the computing device may determine that the signal strength of a neighboring cell is higher than a certain threshold. In alternative embodiments, the computing device may determine that the signal strength of the cell that the device is currently camped on is weaker than the neighboring cell or weaker than a certain threshold. In operation 402, the computing device switches its internal configuration parameters to the parameters of the neighboring cell with a sufficiently high signal strength. In one embodiment, to switch to the neighboring cell, the device switches to the particular frequency and scrambling code of that cell.

In operation 403, once the computing device has switched to the neighboring cell, the device transmits cell location data to a remote system (e.g., server, database, etc.). The information transmitted to the remote system may include but is not limited to geographic location of the device, signal strength measured at that location, type of tower, cell border information and the like. In operation 404, the computing device receives the cell location data for the neighboring cells from the remote system. This information can be provided to the computing device in response to the computing device uploading the cell location data to the remote system. The cell location data of the neighboring cells can then be utilized by the computing device to selectively measure the signal strength of the neighboring cells, such as during the reselection process.

Figure 5:
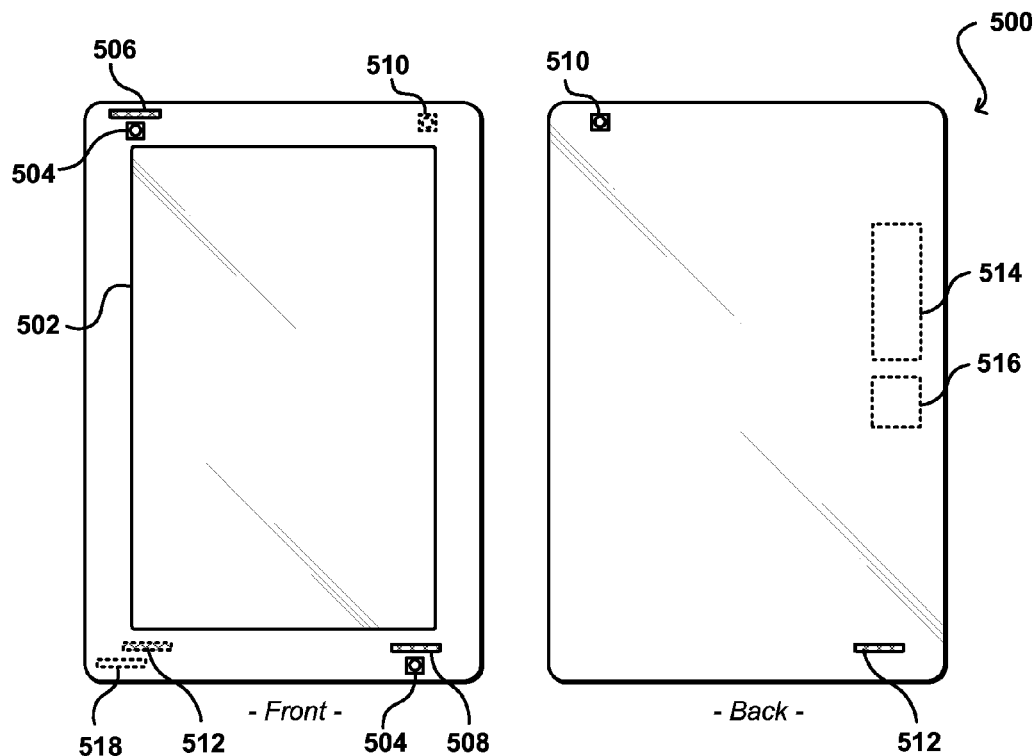
FIG. 5 illustrates front and back views of an example portable computing device that can be used in accordance with various embodiments.

FIG. 5 illustrates front and back views of an example portable computing device 500 that can be used in accordance with various embodiments. Although one type of portable computing device (e.g., a smart phone, an electronic book reader, or tablet computer) is shown, it should be understood that various other types of electronic devices that are capable of determining, processing, and providing input can be used in accordance with various embodiments discussed herein. The devices can include, for example, notebook computers, personal data assistants, cellular phones, video gaming consoles or controllers, and portable media players, among others.

In this example, the portable computing device 500 has a display screen 502 (e.g., a liquid crystal display (LCD) element) operable to display image content to one or more users or viewers of the device. In at least some embodiments, the display screen provides for touch or swipe-based input using, for example, capacitive or resistive touch technology. Such a display element can be used to, for example, enable a user to provide input by pressing on an area of the display corresponding to an image of a button, such as a right or left mouse button, touch point, etc. The device can also have touch and/or pressure sensitive material 610 on other areas of the device as well, such as on the sides or back of the device. While in at least some embodiments a user can provide input by touching or squeezing such a material, in other embodiments the material can be used to detect motion of the device through movement of a patterned surface with respect to the material.

The example portable computing device can include one or more image capture elements for purposes such as conventional image and/or video capture. As discussed elsewhere herein, the image capture elements can also be used for purposes such as to determine motion and receive gesture input. While the portable computing device in this example includes one image capture element 504 on the "front" of the device and one image capture element 510 on the "back" of the device, it should be understood that image capture elements could also, or alternatively, be placed on the sides or corners of the device, and that there can be any appropriate number of capture elements of similar or different types. Each image capture element may be, for example, a camera, a charge-coupled device (CCD), a motion detection sensor, or an infrared sensor, or can utilize another image capturing technology.

The portable computing device can also include at least one microphone 506 or other audio capture element capable of capturing audio data, such as may be used to receive user input in certain embodiments. In some devices there may be only one microphone, while in other devices there might be at least one microphone on each side and/or corner of the device, or in other appropriate locations.

The device 500 in this example also includes at least one motion or position determining element operable to provide information such as a position, direction, motion, or orientation of the device. These elements can include, for example, accelerometers, inertial sensors, electronic gyroscopes, electronic compasses, and GPS receivers. Various types of motion or changes in orientation can be used to provide input to the device that can trigger at least one control signal for another device. The example device also includes at least one communication mechanism 514, such as may include at least one wireless communications component operable to communicate with a network element or with one or more other portable computing devices. The device also includes a power system 516, such as may include a battery operable to be recharged through conventional plug-in approaches, or through other approaches such as capacitive charging through proximity with a power mat or other such device. Various other elements and/or combinations are possible as well within the scope of various embodiments.

Figure 6:
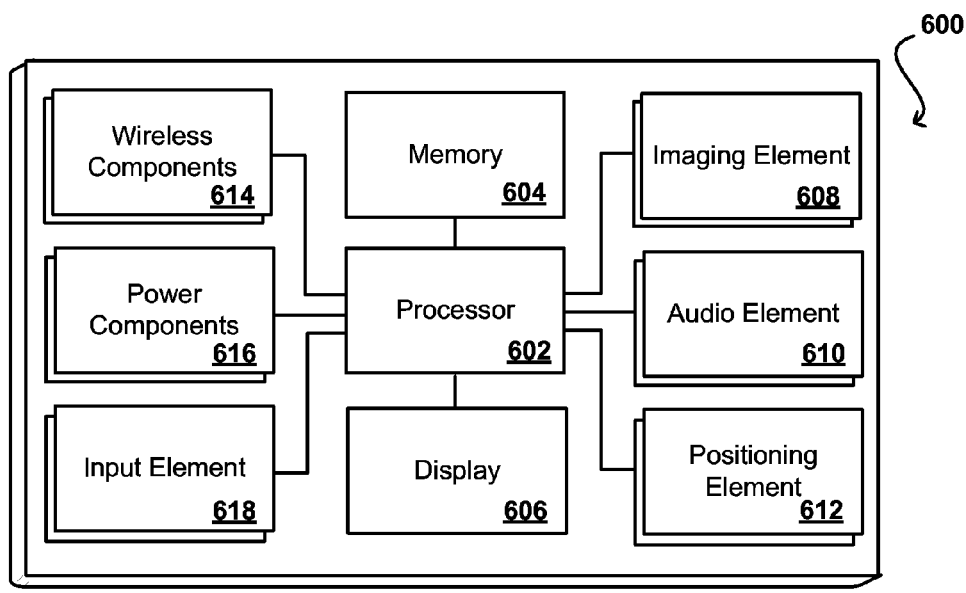
FIG. 6 illustrates an example set of basic components of a portable computing device, such as the device described with respect to FIG. 5.

In order to provide functionality such as that described with respect to FIG. 5, FIG. 6 illustrates an example set of basic components of a portable computing device 600, such as the device 500 described with respect to FIG. 5. In this example, the device includes at least one processor 602 for executing instructions that can be stored in at least one memory device or element 604. As would be apparent to one of ordinary skill in the art, the device can include many types of memory, data storage or computer-readable storage media, such as a first data storage for program instructions for execution by the processor 602, the same or separate storage can be used for images or data, a removable storage memory can be available for sharing information with other devices, etc.

The device typically will include some type of display element 606, such as a touch screen, electronic ink (e-ink), organic light emitting diode (OLED) or liquid crystal display (LCD), although devices such as portable media players might convey information via other means, such as through audio speakers. As discussed, the device in many embodiments will include at least one image capture element 608, such as one or more cameras that are able to image a user, people, or objects in the vicinity of the device. In at least some embodiments, the device can use the image information to determine gestures or motions of the user, which will enable the user to provide input through the portable device without having to actually contact and/or move the portable device. An image capture element also can be used to determine the surroundings of the device, as discussed herein. An image capture element can include any appropriate technology, such as a CCD image capture element having a sufficient resolution, focal range and viewable area, to capture an image of the user when the user is operating the device.

The device, in many embodiments, will include at least one audio element 610, such as one or more audio speakers and/or microphones. The microphones may be used to facilitate voice-enabled functions, such as voice recognition, digital recording, etc. The audio speakers may perform audio output. In some embodiments, the audio speaker(s) may reside separately from the device. The device, as described above relating to many embodiments, may also include at least one positioning element 612 that provides information such as a position, direction, motion, or orientation of the device. This positioning element 612 can include, for example, accelerometers, inertial sensors, electronic gyroscopes, electronic compasses, and GPS elements.

The device can include at least one additional input device 618 that is able to receive conventional input from a user. This conventional input can include, for example, a push button, touch pad, touch screen, wheel, joystick, keyboard, mouse, trackball, keypad or any other such device or element whereby a user can input a command to the device. These I/O devices could even be connected by a wireless infrared or Bluetooth or other link as well in some embodiments. In some embodiments, however, such a device might not include any buttons at all and might be controlled only through a combination of visual and audio commands such that a user can control the device without having to be in contact with the device.

The example device also includes one or more wireless communications components 614 operable to communicate with the cellular network and/or with one or more portable computing devices within a communication range of the particular wireless channel. The wireless channel can be any appropriate channel used to enable devices to communicate wirelessly, such as Bluetooth, cellular, or Wi-Fi channels. It should be understood that the device can have one or more conventional wired communications connections as known in the art. The example device includes various power components 616 known in the art for providing power to a portable computing device, which can include capacitive charging elements for use with a power pad or similar device as discussed elsewhere herein. The example device also can include at least one touch and/or pressure sensitive element 618, such as a touch sensitive material around a casing of the device, at least one region capable of providing squeeze-based input to the device, etc. In some embodiments this material can be used to determine motion, such as of the device or a user's finger, for example, while in other embodiments the material will be used to provide specific inputs or commands.

In some embodiments, a device can include the ability to activate and/or deactivate detection and/or command modes, such as when receiving a command from a user or an application, or retrying to determine an audio input or video input, etc. In some embodiments, a device can include an infrared detector or motion sensor, for example, which can be used to activate one or more detection modes. For example, a device might not attempt to detect or communicate with devices when there is not a user in the room. If an infrared detector (i.e., a detector with one-pixel resolution that detects changes in state) detects a user entering the room, for example, the device can activate a detection or control mode such that the device can be ready when needed by the user, but conserve power and resources when a user is not nearby.

A computing device, in accordance with various embodiments, may include a light-detecting element that is able to determine whether the device is exposed to ambient light or is in relative or complete darkness. Such an element can be beneficial in a number of ways. In certain conventional devices, a light-detecting element is used to determine when a user is holding a cell phone up to the user's face (causing the light-detecting element to be substantially shielded from the ambient light), which can trigger an action such as the display element of the phone to temporarily shut off (since the user cannot see the display element while holding the device to the user's ear). The light-detecting element could be used in conjunction with information from other elements to adjust the functionality of the device. For example, if the device is unable to detect a user's view location and a user is not holding the device but the device is exposed to ambient light, the device might determine that it has likely been set down by the user and might turn off the display element and disable certain functionality. If the device is unable to detect a user's view location, a user is not holding the device and the device is further not exposed to ambient light, the device might determine that the device has been placed in a bag or other compartment that is likely inaccessible to the user and thus might turn off or disable additional features that might otherwise have been available. In some embodiments, a user must either be looking at the device, holding the device or have the device out in the light in order to activate certain functionality of the device. In other embodiments, the device may include a display element that can operate in different modes, such as reflective (for bright situations) and emissive (for dark situations). Based on the detected light, the device may change modes.

Using the microphone, the device can disable other features for reasons substantially unrelated to power savings.

For example, the device can use voice recognition to determine people near the device, such as children, and can disable or enable features, such as Internet access or parental controls, based thereon. Further, the device can analyze recorded noise to attempt to determine an environment, such as whether the device is in a car or on a plane, and that determination can help to decide which features to enable/disable or which actions are taken based upon other inputs. If voice recognition is used, words can be used as input, either directly spoken to the device or indirectly as picked up through conversation. For example, if the device determines that it is in a car, facing the user and detects a word such as "hungry" or "eat," then the device might turn on the display element and display information for nearby restaurants, etc. A user can have the option of turning off voice recording and conversation monitoring for privacy and other such purposes.

In some of the above examples, the actions taken by the device relate to deactivating certain functionality for purposes of reducing power consumption. It should be understood, however, that actions can correspond to other functions that can adjust similar and other potential issues with use of the device. For example, certain functions, such as requesting Web page content, searching for content on a hard drive and opening various applications, can take a certain amount of time to complete. For devices with limited resources, or that have heavy usage, a number of such operations occurring at the same time can cause the device to slow down or even lock up, which can lead to inefficiencies, degrade the user experience and potentially use more power.

In order to address at least some of these and other such issues, approaches in accordance with various embodiments can also utilize information such as user gaze direction to activate resources that are likely to be used in order to spread out the need for processing capacity, memory space and other such resources.

In some embodiments, the device can have sufficient processing capability, and the imaging element and associated analytical algorithm(s) may be sensitive enough to distinguish between the motion of the device, motion of a user's head, motion of the user's eyes and other such motions, based on the captured images alone. In other embodiments, such as where it may be desirable for the process to utilize a fairly simple imaging element and analysis approach, it can be desirable to include at least one orientation determining element that is able to determine a current orientation of the device. In one example, the at least one orientation determining element is at least one single- or multi-axis accelerometer that is able to detect factors such as three-dimensional position of the device and the magnitude and direction of movement of the device, as well as vibration, shock, etc. Methods for using elements such as accelerometers to determine orientation or movement of a device are also known in the art and will not be discussed herein in detail. Other elements for detecting orientation and/or movement can be used as well within the scope of various embodiments for use as the orientation determining element. When the input from an accelerometer or similar element is used along with the input from the camera, the relative movement can be more accurately interpreted, allowing for a more precise input and/or a less complex image analysis algorithm.

When using an imaging element of the computing device to detect motion of the device and/or user, for example, the computing device can use the background in the images to determine movement. For example, if a user holds the device at a fixed orientation (e.g. distance, angle, etc.) to the user and the user changes orientation to the surrounding environment, analyzing an image of the user alone will not result in detecting a change in an orientation of the device. Rather, in some embodiments, the computing device can still detect movement of the device by recognizing the changes in the background imagery behind the user. So, for example, if an object (e.g. a window, picture, tree, bush, building, car, etc.) moves to the left or right in the image, the device can determine that the device has changed orientation, even though the orientation of the device with respect to the user has not changed. In other embodiments, the device may detect that the user has moved with respect to the device and adjust accordingly. For example, if the user tilts their head to the left or right with respect to the device, the content rendered on the display element may likewise tilt to keep the content in orientation with the user.

Figure 7:
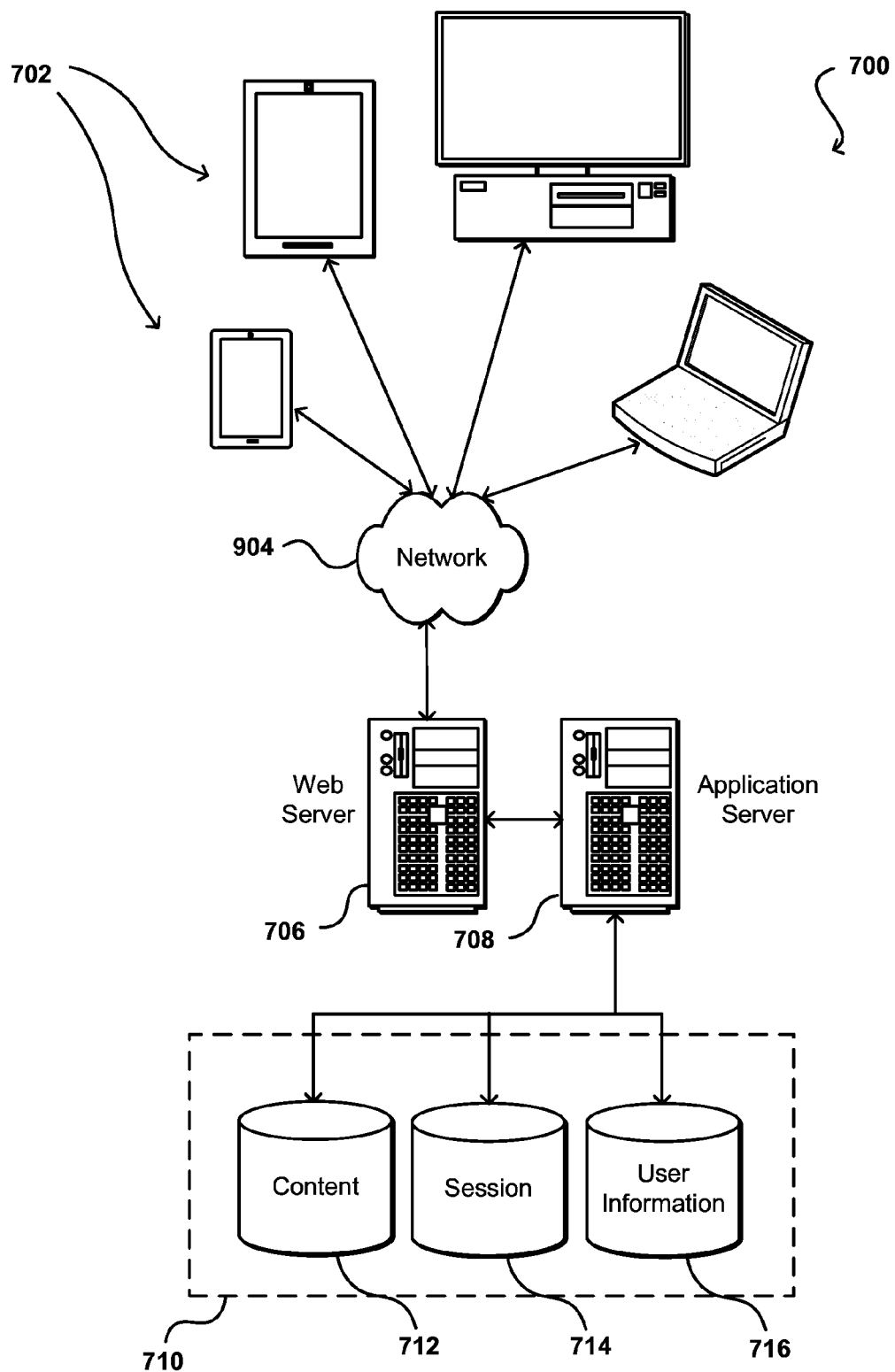
FIG. 7 illustrates an example of an environment for implementing aspects in accordance with various embodiments.

As discussed, different approaches can be implemented in various environments in accordance with the described embodiments. For example, FIG. 7 illustrates an example of an environment 700 for implementing aspects in accordance with various embodiments. As will be appreciated, although a Web-based environment is used for purposes of explanation, different environments may be used, as appropriate, to implement various embodiments. The system includes an electronic client device 702, which can include any appropriate device operable to send and receive requests, messages or information over an appropriate network 804 and convey information back to a user of the device. Examples of such client devices include personal computers, cell phones, handheld messaging devices, laptop computers, set-top boxes, personal data assistants, electronic book readers and the like. The network can include any appropriate network, including an intranet, the Internet, a cellular network, a local area network or any other such network or combination thereof. The network could be a "push" network, a "pull" network, or a combination thereof. In a "push" network, one or more of the servers push out data to the client device. In a "pull" network, one or more of the servers send data to the client device upon request for the data by the client device. Components used for such a system can depend at least in part upon the type of network and/or environment selected. Protocols and components for communicating via such a network are well known and will not be discussed herein in detail. Communication over the network can be enabled via wired or wireless connections and combinations thereof. In this example, the network includes the Internet, as the environment includes a Web server 706 for receiving requests and serving content in response thereto, although for other networks, an alternative device serving a similar purpose could be used, as would be apparent to one of ordinary skill in the art.

The illustrative environment includes at least one application server 708 and a data store 710. It should be understood that there can be several application servers, layers or other elements, processes or components, which may be chained or otherwise configured, which can interact to perform tasks such as obtaining data from an appropriate data store. As used herein, the term "data store" refers to any device or combination of devices capable of storing, accessing and retrieving data, which may include any combination and number of data servers, databases, data storage devices and data storage media, in any standard, distributed or clustered environment. The application server 708 can include any appropriate hardware and software for integrating with the data store 710 as needed to execute aspects of one or more applications for the client device and handling a majority of the data access and business logic for an application. The application server provides access control services in cooperation with the data store and is able to generate content such as text, graphics, audio and/or video to be transferred to the user, which may be served to the user by the Web server 706 in the form of HTML, XML or another appropriate structured language in this example. The handling of all requests and responses, as well as the delivery of content between the client device 702 and the application server 708, can be handled by the Web server 706. It should be understood that the Web and application servers are not required and are merely example components, as structured code discussed herein can be executed on any appropriate device or host machine as discussed elsewhere herein.

The data store 710 can include several separate data tables, databases or other data storage mechanisms and media for storing data relating to a particular aspect. For example, the data store illustrated includes mechanisms for storing content (e.g., production data) 712 and user information 716, which can be used to serve content for the production side. The data store is also shown to include a mechanism for storing log or session data 714. It should be understood that there can be many other aspects that may need to be stored in the data store, such as page image information and access rights information, which can be stored in any of the above listed mechanisms as appropriate or in additional mechanisms in the data store 710. The data store 710 is operable, through logic associated therewith, to receive instructions from the application server 708 and obtain, update or otherwise process data in response thereto. In one example, a user might submit a search request for a certain type of item. In this case, the data store might access the user information to verify the identity of the user and can access the catalog detail information to obtain information about items of that type. The information can then be returned to the user, such as in a results listing on a Web page that the user is able to view via a browser on the client device 702. Information for a particular item of interest can be viewed in a dedicated page or window of the browser.

Each server typically will include an operating system that provides executable program instructions for the general administration and operation of that server and typically will include computer-readable medium storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 7. Thus, the depiction of the system 700 in FIG. 7 should be taken as being illustrative in nature and not limiting to the scope of the disclosure.

The various embodiments can be further implemented in a wide variety of operating environments, which in some cases can include one or more user computers or computing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system can also include a number of workstations running any of a variety of commercially-available operating systems and other known applications for purposes such as development and database management. These devices can also include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as TCP/IP, OSI, FTP, UPnP, NFS, CIFS and AppleTalk. The network can be, for example, a local area network, a wide-area network, a virtual private network, the Internet, an intranet, an extranet, a public switched telephone network, an infrared network, a wireless network and any combination thereof.

In embodiments utilizing a Web server, the Web server can run any of a variety of server or mid-tier applications, including HTTP servers, FTP servers, CGI servers, data servers, Java servers and business application servers. The server(s) may also be capable of executing programs or scripts in response requests from user devices, such as by executing one or more Web applications that may be implemented as one or more scripts or programs written in any programming language, such as Java®, C, C# or C++ or any scripting language, such as Perl, Python or TCL, as well as combinations thereof. The server(s) may also include database servers, including without limitation those commercially available from Oracle®, Microsoft®, Sybase® and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch-sensitive display element or keypad) and at least one output device (e.g., a display device, printer or speaker). Such a system may also include one or more storage devices, such as disk drives, optical storage devices and solid-state storage devices such as random access memory (RAM) or read-only memory (ROM), as well as removable media devices, memory cards, flash cards, etc.

Such devices can also include a computer-readable storage media reader, a communications device (e.g., a modem, a network card (wireless or wired), an infrared communication device) and working memory as described above. The computer-readable storage media reader can be connected with, or configured to receive, a computer-readable storage medium representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computing device, comprising:
   a global positioning system (GPS) component;
   a wireless communication component;
   at least one processor; and
   memory including instructions that, when executed by the at least one processor, cause the computing device to:
      receive a network broadcast message from a base station associated with a current cell camped on by the computing device, the network broadcast message including information related to a plurality of neighboring cells of the current cell;
      receive first cell location information associated with a first neighboring cell of the plurality of neighboring cells and second cell location information associated with a second neighboring cell of the plurality of neighboring cells;
      determine a location of the computing device based at least in part on data obtained by the GPS component;
      determine that the first neighboring cell is located beyond a threshold distance of the location of the computing device;
      determine that the second neighboring cell is located within the threshold distance of the location of the computing device;
      measure a first signal strength of the first neighboring cell at a first rate that is less than a second rate for measuring a second signal strength of the second neighboring cell based at least in part on the first neighboring cell being located beyond the threshold distance and the second neighboring cell being located within the threshold distance;
      determine that the first signal strength of the first neighboring cell exceeds both a predefined threshold with respect to a current signal strength of the current cell and that the second signal strength of the second neighboring cell is below the predefined threshold with respect to the current signal strength; and
      switch to a communication channel associated with the first neighboring cell.

2. The computing device of claim 1, wherein the network broadcast message includes a list of the plurality of neighboring cells and further includes respective cell location information for each cell in the list, the respective cell location information for each cell including at least one of: global positioning system (GPS) coordinates of a center of the cell, a radius of the cell, or information identifying one or more edges of the cell.

3. The computing device of claim 1, wherein the memory further includes instructions that, when executed by the at least one processor, cause the computing device to:
   transmit cell location information of at least one neighboring cell of the plurality of neighboring cells to a remote system,
   wherein the remote system provides the cell location information to a second computing device, and
   wherein the second computing device uses the cell location information received from the remote system to exclude at least one neighboring cell from a second plurality of neighboring cells of a second current cell camped on by the second computing device each for which the second computing device measures a respective signal strength, or to reduce a rate for measuring a signal strength of at least one neighboring cell of the second plurality of neighboring cells.

4. A computer implemented method, comprising:
   receiving first location information for a first neighboring cell of a current cell camped on by a computing device and second location information for a second neighboring cell of the current cell;
   determining a current geographic location of the computing device;
   determining that the first neighboring cell is located beyond a threshold distance of the current geographic location;
   determining that the second neighboring cell is located within the threshold distance of the current geographic location;
   measuring a first signal strength of the first neighboring cell at a first rate that is less than a second rate for measuring a second signal strength of the second neighboring cell based at least in part on the first neighboring cell being located beyond the threshold distance and the second neighboring cell being located within the threshold distance;
   determining that the first signal strength of the first neighboring cell exceeds a predefined threshold with respect to a current signal strength of the current cell;
   determining that the second signal strength of the second neighboring cell is below the predefined threshold with respect to the current signal strength; and
   switching to a communication channel associated with the first neighboring cell.

5. The computer implemented method of claim 4, further comprising:
   determining a direction of movement of the computing device;
   determining to exclude a third neighboring cell of the current cell from a plurality of neighboring cells of the current cell based at least in part on the direction of movement corresponding to a direction away from a third location associated with the third neighboring cell; and measuring the respective signal strength of remaining neighboring cells of the plurality of neighboring cells.

6. The computer implemented method of claim 4, further comprising:

receiving, by the computing device, a network broadcast message that includes a list of neighboring cells of the current cell and respective location information for each neighboring cell in the list, the respective location information for each cell including at least one of: global positioning system (GPS) coordinates of a center of the cell, a radius of the cell, or information identifying one or more edges of the cell.

7. The computer implemented method of claim 4, further comprising:

transmitting location information of at least one neighboring cell of the current cell from the computing device to a remote system, wherein the remote system provides the location information to a second computing device, and wherein the second computing device uses the location information received from the remote system to exclude at least one neighboring cell of a second current cell camped on by the second computing device from a plurality of neighboring cells of the second current cell each for which the second computing device measures a respective signal strength, or to reduce a rate for measuring a signal strength of at least one neighboring cell of the second current cell.

8. The computer implemented method of claim 4, further comprising:

transmitting, to a remote system, an indication that the computing device has switched to the first neighboring cell; and receiving, from the remote system, the respective location information for a plurality of neighboring cells corresponding to the first neighboring cell.

9. A computing device, comprising:

at least one processor; and memory including instructions that, when executed by the at least one processor, cause the computing device to:

receive first location information for a first neighboring cell of a current cell camped on by the computing device and second location information for a second neighboring cell of the current cell;

determine a current geographic location of the computing device;

determine that the first neighboring cell is located beyond a threshold distance of the current geographic location;

determine that the second neighboring cell is located within the threshold distance of the current geographic location;

measure a first signal strength of the first neighboring cell at a first rate that is less than a second rate for measuring a second signal strength of the second neighboring cell based at least in part on the first neighboring cell being located beyond the threshold distance and the second neighboring cell being located within the threshold distance;

determine that the first signal strength of the first neighboring cell exceeds a predefined threshold with respect to a current signal strength of the current cell;

determine that the second signal strength of the second neighboring cell is below the predefined threshold with respect to the current signal strength; and switch to a communication channel associated with the first neighboring cell.

10. The computing device of claim 9, wherein the instructions, when executed by the at least one processor, further cause the computing device to:

determine a direction of movement of the computing device;

determine, based at least in part on the direction of movement corresponding to a direction away from a third neighboring cell of the current cell, to exclude the third neighboring cell from a plurality of neighboring cells; and measure the respective signal strength of remaining neighboring cells of the plurality of neighboring cells.

11. The computing device of claim 9, wherein the instructions, when executed by the at least one processor, further cause the computing device to:

receive a network broadcast message that includes a list of neighboring cells of the current cell and respective location information for each neighboring cell in the list, the respective location information for each cell including at least one of: global positioning system (GPS) coordinates of a center of the cell, a radius of the cell, or information identifying one or more edges of the cell.

12. The computing device of claim 9, wherein the instructions, when executed by the at least one processor, further cause the computing device to:

transmit location information of at least one neighboring cell of the current cell from the computing device to a remote system, wherein the remote system provides the location information to a second computing device, and wherein the second computing device uses the location information received from the remote system to exclude at least one neighboring cell of a second current cell camped on by the second computing device from a plurality of neighboring cells of the second current cell each for which the second computing device measures a respective signal strength, or to reduce a rate for measuring a signal strength of at least one neighboring cell of the second current cell.

13. The computing device of claim 9, wherein the instructions, when executed by the at least one processor, further cause the computing device to:

transmit, to a remote system, an indication that the computing device has switched to the first neighboring cell; and receive, from the remote system, the respective location information for a plurality of neighboring cells corresponding to the first neighboring cell.

14. A non-transitory computer readable storage medium storing one or more sequences of instructions, when executed by one or more processors, to cause the one or more processors to perform a set of operations comprising:

receiving first location information for a first neighboring cell of a current cell camped on by a computing device and second location information for a second neighboring cell of the current cell;

determining a current geographic location of the computing device; and determining that the first neighboring cell is located beyond a threshold distance of the current geographic location;

determining that the second neighboring cell is located within the threshold distance of the current geographic location;

measuring a first signal strength of the first neighboring cell that is less than a second rate for measuring a second signal strength of the second neighboring cell based at least in part on the first neighboring cell being located beyond the threshold distance and the second neighboring cell being located within the threshold distance;

determining that the first signal strength of the first neighboring cell exceeds a predefined threshold with respect to a current signal strength of the current cell;

determining that the second signal strength of the second neighboring cell is below the predefined threshold with respect to the current signal strength; and switching to a communication channel associated with the first neighboring cell.

15. The non-transitory computer readable storage medium of claim 14, wherein the one or more sequences of instructions, when executed by the one or more processors, further cause the one or more processors to perform:

transmitting, to a remote system, an indication that the computing device has switched to the first neighboring cell; and receiving, from the remote system, the respective location information for a plurality of neighboring cells corresponding to the first neighboring cell.

16. The non-transitory computer readable storage medium of claim 14, wherein the one or more sequences of instructions, when executed by the one or more processors, further cause the one or more processors to perform:

determining a direction of movement of the computing device;

determining, based at least in part on the direction of movement corresponding to a direction away from a third neighboring cell of the current cell, to exclude the third neighboring cell from a plurality of neighboring cells; and measuring the respective signal strength of remaining neighboring cells of the plurality of neighboring cells.

17. The non-transitory computer readable storage medium of claim 14, wherein the one or more sequences of instructions, when executed by the one or more processors, further cause the one or more processors to perform:

receiving, by the computing device, a network broadcast message that includes a list of neighboring cells of the current cell and respective location information for each neighboring cell in the list, the respective location information for each cell including at least one of: global positioning system (GPS) coordinates of a center of the cell, a radius of the cell, or information identifying one or more edges of the cell.

18. The non-transitory computer readable storage medium of claim 14, wherein the one or more sequences of instructions, when executed by the one or more processors, further cause the one or more processors to perform:

transmitting location information of at least one neighboring cell of the current cell from the computing device to a remote system, wherein the remote system provides the location information to a second computing device, and wherein the second computing device uses the location information received from the remote system to exclude at least one neighboring cell of a second current cell camped on by the second computing device from a plurality of neighboring cells of the second current cell each for which the second computing device measures a respective signal strength, or to reduce a rate for measuring a signal strength of at least one neighboring cell of the second current cell.

* * * * *